Oct. 25, 1932.   T. E. JERABEK   1,884,714
ARC WELDING
Filed May 3, 1930
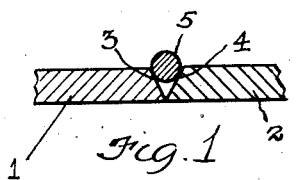
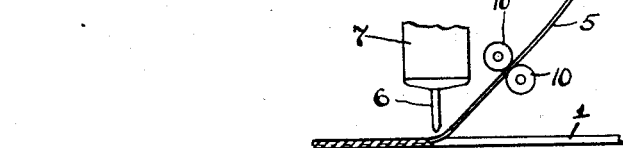
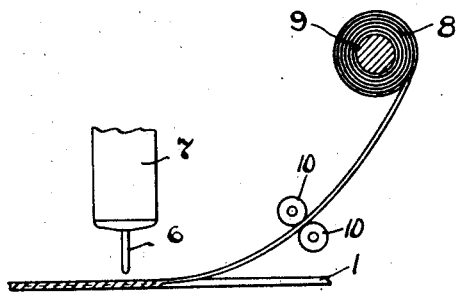
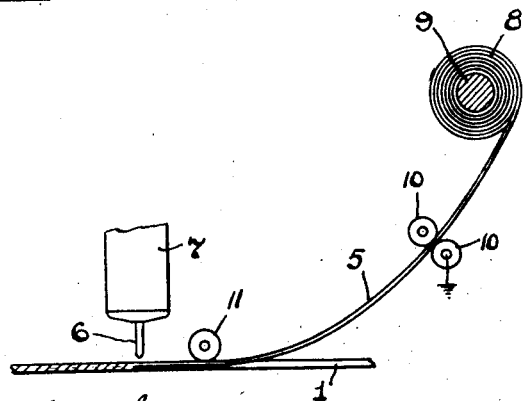
INVENTOR.
Theophil E. Jerabek
BY
Fay, Oberlin & Fay
ATTORNEYS Patented Oct. 25, 1932

1,884,714

UNITED STATES PATENT OFFICE

THEOPHIL E. JERABEK, OF CLEVELAND, OHIO, ASSIGNOR TO THE LINCOLN ELECTRIC CO., OF CLEVELAND, OHIO, A CORPORATION OF OHIO

ARC WELDING

Application filed May 3, 1930. Serial No. 449,411.

My invention, relating as indicated to electric welding, has specific reference to electric arc welding, and in particular, to the method of electric arc welding in which a filler strip is employed to provide additional material along the seam cleft to be welded, so as to insure a welded seam of strength equal to or greater than the body of the elements joined.

My invention relates particularly to electric arc welding which is accomplished by so-called automatic machines wherein the electrode is mounted in a suitable holder and moved thereby longitudinally of the seam. Filler rods or bars are sometimes employed in connection with such automatic welding machines and are positioned on the seam cleft by being merely loosely laid thereon preliminary to the traversing of the work by the welding electrode. With the employment of the automatic welders numerous means are employed to accurately direct the blow or direction of the welding arc between the electrode and the work, such arc controlling means sometimes taking the form of means which produces a flux across the seam gap or co-axially with the welding electrode, which flux has a tendency to maintain the arc stable as the electrode is moved along the seam. By employing flux producing means to steady the arc, such flux has a tendency and frequently does dislodge the filler bar or strip from the seam cleft so that continual replacement thereof by the operator is necessary. A further source of annoyance lies in the vibration sometimes incidental to the welding operation, which vibration is also sufficient to dislodge the filler strip or bar from its place on the seam.

The mal-adjustment of the filler bar or strip with respect to the seam cleft, due to the action of the arc controlling flux, or the vibration of the machine, has heretofore been prevented by tacking such bar or strip, at spaced points, to the work adjacent the seam. This method of securing the filler bar or strip is undesirable, due to the time and expense required to accomplish such tacking.

It is among the objects of my invention to provide a method of electric welding whereby all of the above-named undesirable conditions are obviated and, further, a method in which a control of the filler strip or bar is possible, having advantages not found in any previous method.

By placing the filler bar or strip on the seam cleft as has heretofore been the only method of employing such bar or strip, in order to vary the amount of additional material which was to be supplied to the seam by such bar or strip, a filler bar of varying cross sectional area was necessary to accomplish this result. By the method comprising my invention the quantity of material added to the seam by the filler bar may be regulated and controlled without varying the size of the filler bar employed. Other objects of my invention will become apparent as the description proceeds.

To the accomplishment of the foregoing and related ends, said invention, then, consists of the means hereinafter fully described and particularly pointed out in the claims, the annexed drawing and the following description setting forth in detail one approved method of carrying out the invention, such disclosed method, however, constituting but one of the various ways in which the principle of the invention may be used.

In said annexed drawing:

Fig. 1 is a fragmentary transverse sectional view of portions of stock adjacent the seam cleft, having positioned thereon a common form of filler bar; Figs. 2, 3 and 4 are fragmentary elevational views showing in somewhat diagrammatic form the principles of my invention and modifications thereof.

Referring more specifically to the drawing and more especially to Fig. 1, the ordinals 1 and 2, respectively, indicate portions of plates to be welded together, the edges 3 and 4, respectively, thereof being beveled to more readily receive the filler bar 5 and to further insure a homogeneous weld throughout the thickness of the plates. The filler bar here shown for purposes of illustration is a round wire which may be formed of material similar to the material in plates 1 and 2. In the practice of welding as heretofore carried on, the bar 5, as above indicated, has had to be tacked or otherwise secured in the seam cleft so that a displacement thereof would not occur under the influence of the arc stabilizing flux or the vibration of the welding machine.

In Fig. 2 is somewhat diagrammatically illustrated one form of the method comprising my invention in which the electrode 6, which may be a carbon pencil, is suitably supported in a holder 7. The holder 7 depends from a carriage (not shown) forming part of the welding machine, which carriage is in the usual form of such machines adapted to move the electrode longitudinally of the seam.

By the method comprising my invention the filler bar 5, which may be in the form of a ribbon, a rectangular rod or a hollow bar, depending upon the particular conditions under which such filler bar is to be employed, is in the form of a continuous element wound on a spool 8. The spool 8 may have the hub 9 thereof mounted on the traveling carriage so as to be free to rotate as the material is drawn off the spool. The filler element 5 is positively fed by means of rollers 10, which contact therewith and may likewise be driven by the motor driving the movable carriage and may be mounted on such carriage, or may be mounted on a separate support and driven by a separate motor.

According to the particular welding operation performed I may prefer to feed the end of the element 5 into the arc immediately above the crater of molten metal in the seam cleft and permit the filler metal as it melts from the end of the element 5 to flow into such crater and provide the required additional amount of metal. It may be advisable, however, to project the terminal of the filler element directly into the crater of molten metal and in this manner supply the additional material.

As indicated in Figs. 3 and 4, it may be advisable to feed the filler element into the seam cleft in advance of the welding arc and when the element 5 is fed into the seam at a point somewhat removed from the welding area it may be necessary, as indicated in Fig. 4, to employ a roller 11 or like means which maintains the filler element in proper position on the seam as the work passes under such roller.

In any of the above described methods I may employ the filler element 5 as one of the leads of the welding circuit, in which case one of the wheels, such as 10 illustrated in Fig. 4, may be grounded, in which case a portion of the welding current or the entire current may flow through the filler element 5. By controlling the amount of current which flows through the filler element the heating thereof due to such current may be controlled, should the filler element be required to be heated preliminary to its introduction to the welding arc.

By the method comprising my invention the amount of material supplied to the seam by the filler element can be regulated by simply regulating the speed of the feed wheels 10 so that such variations in the amount of metal deposited by the filler element can be controlled without varying the cross sectional area of such element.

It has been found that the introduction of the filler element from various positions into the arc area has an influence upon the blow of the arc and consequently by the above outlined method of introducing the filler element to the arc I may, as a further advantage of this method, assist in controlling and stabilizing the arc.

In connection with the above description I have referred to the filler element 5 as being made up entirely of metal and preferably of the same kind of metal as the members 1 and 2. However, as is well known to those familiar with the art, it is frequently essential to employ a coated filler element, which coating provides the necessary flux for the proper carrying on of the welding operation.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method of electric arc welding which consists in presenting an electrode in arcing relation to the work, relatively moving such work and the electrode to cause the latter to follow the line to be welded, introducing a strip of material laterally into the arc area and connecting said electrode and strip of material to opposite poles of a source of electricity whereby at least a part of the welding current passes through said strip.

2. The method of electric arc welding which consists in presenting an electrode in arcing relation to the work, relatively moving such work and electrode to cause the latter to follow the line to be welded, introducing a strip of fusible filler material laterally into the arc area, and connecting said electrode and strip of material to opposite poles of a source of electricity whereby at least a part of the welding current passes through said filler strip.

3. The method of electric arc welding which consists in presenting an electrode in arcing relation to the work, relatively moving such work and the electrode to cause the latter to follow the line to be welded, introducing a flux carrying strip of material laterally into the arc area, connecting said electrode and strip of material to opposite poles of a source of electricity whereby at least a part of the welding current passes through said strip.

Signed by me this 30th day of April, 1930.

THEOPHIL E. JERABEK.